United States Patent [19]

Schaberg

[11] 3,858,143
[45] Dec. 31, 1974

[54] BALL STOP PRESSURE TRANSDUCER

[75] Inventor: Richard R. Schaberg, Ventura, Calif.

[73] Assignee: Statham Instruments, Inc., Oxnard, Calif.

[22] Filed: Apr. 19, 1974

[21] Appl. No.: 462,241

[52] U.S. Cl. .......................... 338/4, 338/36, 338/42
[51] Int. Cl. .............................................. G01l 1/22
[58] Field of Search ................. 338/2, 4, 5, 36, 42; 73/141 A

[56] References Cited
UNITED STATES PATENTS
3,261,204   7/1966   Jacobson ........................ 73/141 A
3,341,796   9/1967   Eisele .............................. 338/42 X Primary Examiner—C. L. Albritton
Attorney, Agent, or Firm—Philip Subkow

[57] ABSTRACT

A force transducer with over-range protection employing a ball and socket stop assembly to limit the displacement of the force collector of the force transducer.

4 Claims, 7 Drawing Figures

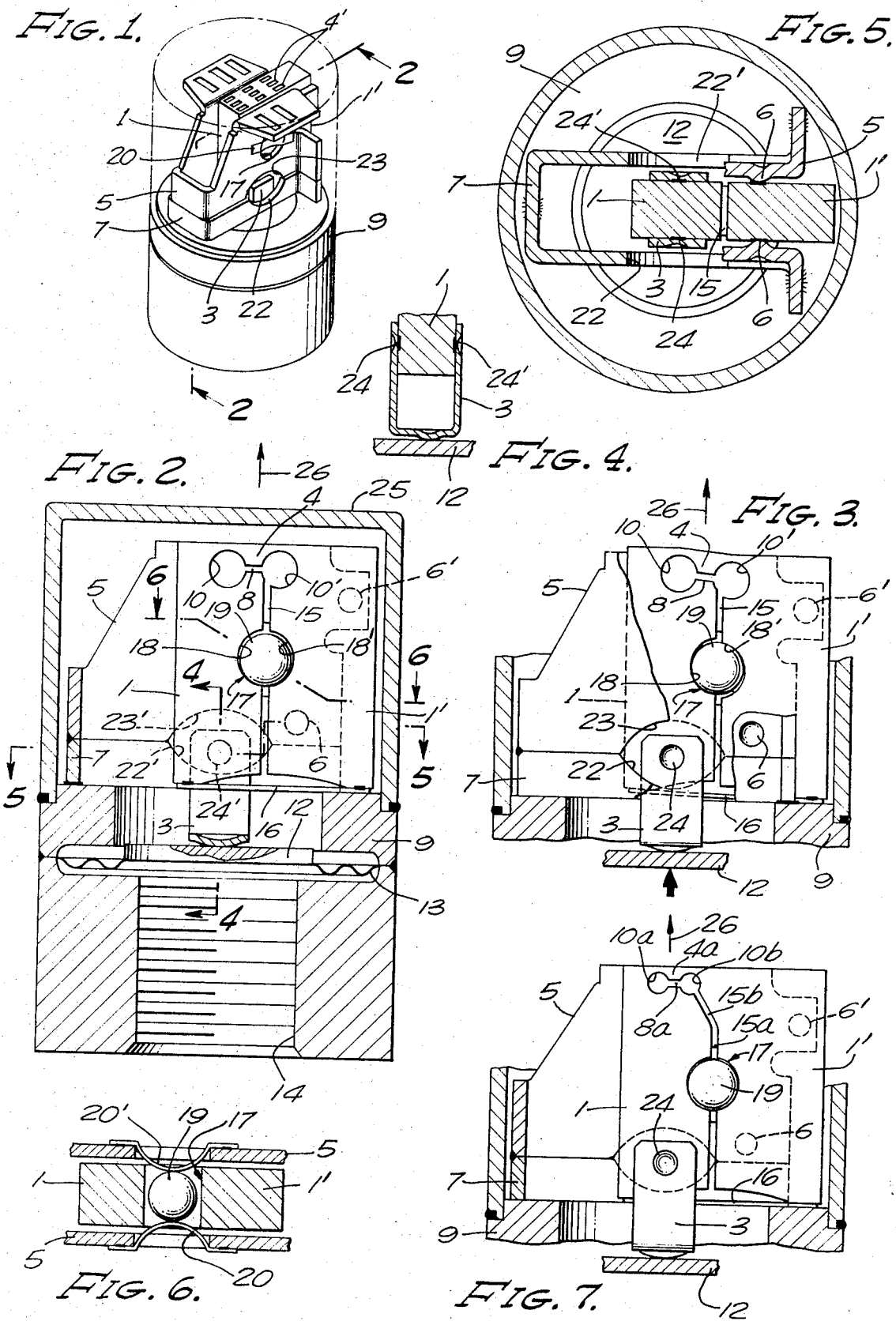

BALL STOP PRESSURE TRANSDUCER

BACKGROUND OF THE INVENTION

Strain gage force transducers, for example, pressure transducers have consisted of a beam linked to a force collector, for example, a link pin connected to a diaphragm which in a pressure transducer is actuated by the pressure media. Strain gages arranged as a Wheatstone bridge are either bonded or vacuum deposited (as a thin film) to the beam or may be in the form of unbonded strain gages. Threaded stop screws with lock nuts are commonly used to limit beam displacement.

Unbonded or bonded strain gages, such as thin film strain gages, typically have a full scale beam displacement of 0.001 to 0.002 inches. Stop contact is required at 130 to 160 percent of full scale. Stop setting is, therefore, a high-skill operation. Also, the general transducer configuration makes it difficult to detect or remove any particle contaminants introduced during assembly that lodge between the stop surfaces. Also, due to machining variances, the stop screw (which is generally hollow and concentric to the link pin) will first make contact with only one side of the link pin flange. Additional pressure application causes bowing of the link pin and further displacement of the beam. The action continues until another contact point, about diametrically positioned on the stop screw opposite the first point of contact is established. This "softness" of stop action adds to the difficulty of making a satisfactory setting. Also, the precision machining required of the stop screws, link pins, and the associated parts and the precision assembly techniques required result in high manufacturing costs.

OBJECTIVES OF INVENTION

It is an object of my invention to make the stop an integral part of the beam, requiring no threaded components nor adjustments.

It is another object of my invention to have the stop visible and accessible for flushing until enclosure by the case.

It is another object of my invention to realize a firm, stable stop having the contact point consistently in the plane median to the sides of the beam and passing through the diaphragm center.

It is another object of my invention to provide stop protection in both directions along sensing axis (differential) pressure applications and acceleration.

It is another object of my invention to employ a stop device which acts independently of the angular direction of the force transmitted by the displacement of the force transmitter.

This invention will be further described in connection with the following figures which illustrate my presently preferred embodiment:

FIG. 1 is a perspective view, partly cut away, of a pressure-transducing device constructed in accordance with the present invention.

FIG. 2 is a sectional view of the beam-stop device showing relative position of components with no pressure applied to the diaphragm.

FIG. 3 is a sectional view of the beam-stop device showing relative position of components with overload applied.

FIG. 4 is a fragmentary section on line 4—4 of FIG. 2.

FIG. 5 is a fragmentary section of a detail of FIG. 2 on line 5—5.

FIG. 6 is a slid section on 6—6 of FIG. 2.

FIG. 7 is a fragmentary section of a modification of FIG. 2.

The pressure transducer includes a corrugated diaphragm 13 welded between a pressure port 14 and a base plate 9. A force collector 12 is welded to the inner diameter of the diaphragm 13. A link 3 in the form of a U saddle is welded to the force collector 12 and to the beam 1. A base bracket 7 is welded to the base plate 9.

A bracket 5 is welded to the beam 1' at 6 and 6' on opposite sides of the beam 1' and to the bracket 7. The beam 1 is connected to one end of the flexure 4 carrying the strain gages 4'. Such flexures and gages are illustrated and described in U.S. Pat. No. 3,765,256. The beam 1 is connected at the other end of the flexure 4 and to the link 3. As shown, I prefer for transducers of suitably small dimensions to form the beams 1 and 1' and the flexure 4 from one piece of metal.

The flexure is formed by two aligned bores 10 and 10' connected by a diametric slot 8. The beams 1 and 1' are separated by a slot 15 which intercepts the bore 10'. The ends of the beams 1 and 1' are connected by a flexible strip 16 to hold the assembly of the beams and flexure against accidental damage during assembly.

The beams 1 and 1' are bored by a bore 17 centered in the midpoint of the separation 15 so that semi-cylindrical grooves 18 and 18' are formed in the beams 1 and 1'. A ball 19 is positioned in the grooves. The diameter of the metallic ball 19 is somewhat smaller than that of the bore 17.

The strips 20 and 20' are welded on both sides of the bracket 5 to retain the ball 19. They are formed so that the ball 19 may rotate freely in the cage formed by the grooves 18, 18' and strips 20 and 20', when the transducer is in the no-load position.

To facilitate assembly, the bracket 7 at each side is notched at 22 and 22'. The bracket 5 is notched at each side by notches 23 and 23' to provide an opening so that when assembled the link 3 may be welded to the beam 1 at each side of the beam at 24 and 24'. A case 25 may be provided.

The variation shown in FIG. 7 applies the principle of U.S. Pat. No. 3,341,796. The bores 10a and 10b are so positioned that the line of application of the force applied by the force collector 12, link 3 and beam 1 passes approximately through the neutral part of the flexure 4a. For this purpose, the bores 10a and 10b are offset from the slot 15a and the slot is formed with an angular extension 15b that intercepts the slot 8a. In other respects, the construction of the form shown in FIG. 7 is the same as described in connection with FIGS. 1-6.

The deflection of the link 3 activates the beam 1. Strain gage 4' yield an electrical signal proportional to the displacement. The operation in this respect is conventional.

For overload conditions, the displacement in either direction along the sensitive axis 26 is limited to the differences between the diameters of the bore 17 and of the ball 19. FIG. 2 shows the components under the condition of no stimulus applied. The linkage end of the beam 1 has freedom of displacement in either direction equal to clearance shown between the bore 17 and ball 19.

FIG. 3 shows the components under a positive overload condition. The ball 19 is shown to have terminated the displacement of the linkage end of the beam 1 and is against the groove 18 and 18'.

A principal feature of this invention is the firmness of the stop mechanism (rapidity, relative to displacement along the sensitive axis 26, of the stop action effect). Theoretically, a perfect sphere touching the inside of a perfect cylinder makes a point contact. However, in this invention, the radii of curvature of the ball 19 and the bore 17 may differ, for example, by only about 1 to 2 percent. Thus, while initial contact is a point, only slight deformation of the ball 19 and the grooves 18 and 18' results in a relatively large contact area. This characteristic increase in contact area limits the compressive stress and hence the strain. There are no significant bending moments applied to the stop components. The shear forces are distributed over the equatorial plane area of the ball 19. This area is much greater than the contact area and so the predominant stress on the stop components is compressive.

Because the ball 19 is free to move and rotate within the bore 17 and because the bore 17 is not "pocketed" by adjacent structure, there is little tendency to trap or hold particle contaminants.

I claim:

1. A force transducer comprising a base, a force collector and a flexure a pair of beams spaced from each other and connected at one end of said beams by said flexure, one of said beams connected to the base of said transducer, the other of said beams connected to said force collector in said transducer, a cylindrical bore, part of said bore positioned in each of said beams, a ball freely positioned for motion in said bore and means responsive to the said force collector to sense a force imposed on said force collector.

2. The force transducer of claim 1, said bore centered between said beams.

3. The force transducer of claim 1, a strain gage on said flexure.

4. The force transducer of claim 2, a strain gage on said flexure.

* * * * *